(12) United States Patent
Michel et al.

(10) Patent No.: US 7,062,002 B1
(45) Date of Patent: Jun. 13, 2006

(54) METHOD FOR SYNCHRONIZING A BASE STATION WITH A MOBILE STATION, A BASE STATION AND A MOBILE STATION

(75) Inventors: Juergen Michel, Munich (DE); Bernhard Raaf, Munich (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/018,312

(22) PCT Filed: Feb. 15, 2000

(86) PCT No.: PCT/EP00/01231

§ 371 (c)(1),
(2), (4) Date: Oct. 29, 2001

(87) PCT Pub. No.: WO00/67404

PCT Pub. Date: Nov. 9, 2000

(30) Foreign Application Priority Data

Apr. 29, 1999 (DE) ................................ 199 19 545
May 18, 1999 (EP) ................................ 99109791.6

(51) Int. Cl.
*H04L 7/00* (2006.01)
(52) U.S. Cl. ........................................ 375/354; 375/145
(58) Field of Classification Search ................ 375/343, 375/149, 152, 200, 206, 367, 340, 130, 140, 375/320, 335, 208, 344, 145, 354; 370/209, 370/342, 441, 335, 350; 714/783; 708/250

See application file for complete search history.

(56) References Cited

U.S. PATENT DOCUMENTS

| 5,717,713 | A  | * | 2/1998 | Natali ........................ 375/149 |
| 5,764,630 | A  | * | 6/1998 | Natali et al. ................. 370/320 |
| 6,181,729 | B1 | * | 1/2001 | O'Farrell ..................... 375/130 |
| 6,567,482 | B1 | * | 5/2003 | Popovic' ..................... 375/343 |
| 6,839,876 | B1 | * | 1/2005 | Tong et al. .................. 714/783 |
| 6,873,647 | B1 | * | 3/2005 | Tiedemann et al. ......... 375/145 |

FOREIGN PATENT DOCUMENTS

WO    WO 96/39749    12/1996
WO    WO 00/14915    3/2000

OTHER PUBLICATIONS

Linear equivalence of binary Golay complementary sequences; Karkkainen, K.H.A.et al; ☐☐Personal, Indoor and Mobile Radio Communications, 1994. Wireless Networks—Catching the Mobile Future. 5th IEEE Int'l Symposium on , Sep. 18-23, 1994 pp.:755-759.*

(Continued)

*Primary Examiner*—Temesghen Ghebretinsae
*Assistant Examiner*—Jacob Meek
(74) *Attorney, Agent, or Firm*—Bell, Boyd & Lloyd LLC

(57) ABSTRACT

Method for forming and determining a signal sequence, a synchronization method, a transmitting unit and a receiving unit, including the formation of signal sequences that are based on partial signal sequences, the second partial signal sequence being repeated and modulated in the process by the first partial signal sequence, and at least one of the signal sequences being a Golay sequence, and use of these partial signal sequences for the purpose of simplified calculation of correlation sums in a two-stage calculation method, with one partial correlation sum sequence being calculated first.

13 Claims, 11 Drawing Sheets

OTHER PUBLICATIONS

Linear complexity of Kronecker sequences; Karkkainen, K.H.A.; Spread Spectrum Techniques and Applications, 1998. Proceedings., 1998 IEEE 5th International Symposium on , vol.: 1, Sep. 2-4, 1998; pp.:51-55 vol. 1.*

Evalution of coding and modulation schemes based on Galay complementary sequences for efficient OFDM transmission Hunziker, T. et al ; Vehicular Technology Conference, 1998. VTC 98. 48th IEEE , vol.: 2 , May 18-21, 1998 pp.:1631-1635 vol. 2.*

New complementary pairs of sequences; Budisin, S.Z. ; Electronics Letters ,vol.: 26 , Issue: 13 , Jun. 21, 1990 pp.:881-883.*

TSG-RAN Working Group 1 meeting #3 New RACH preambles with low auto-correlation sidelobes and reduced detector complexity TSGR1#3(99)205; Ericsson; 1 Nynäshamn, Sweden Mar. 22-26, 1999.*

Spreading sequences for multicarrier CDMA systems; Popovic, B.M.; Communications, IEEE Transactions on vol. 47, Issue 6, Jun. 1999 pp.:918-926.*

Linear complexity of Kronecker sequences; Karkkainen, K.H.A.; Spread Spectrum Techniques and Applications, 1998. Proceedings., 1998 IEEE 5th International Symposium on vol. 1, Sep. 2-4, 1998 pp.:51-55 vol. 1.*

Efficient Pulse Compressor for Golay Complementary Sequences.

Golay Complementary Sequences are Superior to PN Sequences, Budisin, p. w 101-104.

XP-000791008, Concatenated Sequences for Spread Spectrum Systems, Maskara, pp. 342-350.

XP-000107922—Electronic Letters 26 Jun. 21, (1990) No. 13.

* cited by examiner

METHOD FOR SYNCHRONIZING A BASE STATION WITH A MOBILE STATION, A BASE STATION AND A MOBILE STATION

BACKGROUND OF THE INVENTION

In signal transmission systems, such as mobile radio systems, it is necessary for one of the communication partners (first transmission unit) to detect specific fixed signals which are emitted by another communication partner (second transmission unit). These can be, for example, what are termed synchronization bursts for synchronizing two synchronization partners such as radio stations, for example, or what are termed access bursts.

In order to detect or identify such received signals reliably by contrast with the ambient noise, it is known to correlate the received signal continuously with a prescribed signal sequence over a fixed time duration, and to form the correlation sum over the time duration of the prescribed signal sequence. The range of the received signal, which yields a maximum correlation sum, corresponds to the signal being searched for. Connected upstream, as what is termed a training sequence, of the synchronization signal from the base station of a digital mobile radio system, is, for example, a signal sequence which is detected or determined in the mobile station in the way just described by correlation with the stored signal sequence. The mobile stations can, thus, be synchronized with the base station.

Such correlation calculations are also necessary in the base stations; for example, in the case of random-access-channel (RACH) detection. Moreover, a correlation calculation is also carried out to determine the channel pulse response and the signal propagation times of received signal bursts.

The correlation sum is calculated as follows in this case:

$$Sm = \sum_{i=0}^{n-1} E(i+m) * K(i)$$

E(i) being a received signal sequence derived from the received signal, and K(i) being the prescribed signal sequence, i running from 0 to n−1. The correlation sum Sm is calculated sequentially for a number of temporally offset signal sequences E(i) obtained from the received signal, and then maximum value of Sm is determined. If k sequential correlation sums are to be calculated, the outlay on calculation is k*n operations, the multiplication and addition being counted together as one operation.

The calculation of the correlation sums is, therefore, very complicated and, particularly in real time applications such as voice communication or radio telephony or in CDMA systems, requires powerful, and expensive processors which have a high power consumption during calculation. For example, a known signal sequence of length 256 chips (a transmitted bit is also termed a chip in CDMA) is to be determined for the purpose of synchronizing the UMTS mobile radio system, which is being standardized. The sequence is repeated every 2560 chips. Since the mobile station initially operates asynchronously relative to the chip clock, the received signal must be oversampled in order to retain an adequate signal even given an unfavorable sampling situation. Because of the sampling of the I and Q components, this leads to 256*2560*2*2=2621440 operations.

WO 96 39749 A discloses transmitting a synchronization sequence, a chip of the sequence itself being a sequence.

The use of Golay sequences as an alternative to PN sequences is known from "Srdjan Budisin: Golay Complementary Sequences are Superior to PN Sequences, Proceedings of the International Conference on Systems Engineering, U.S., New York, IEEE, Vol.-, 1992, pages 101–104, XP 000319401 ISBN: 0-7803-0734-8".

It is an object of the present invention to specify methods for synchronizing a base station with a mobile station, as well as to specify a base station and a mobile station, which permits a base station to be synchronized with a mobile station in a way which is reliable and favorable in terms of outlay.

SUMMARY OF THE INVENTION

The present invention is based firstly on the idea of using, for synchronization purposes, signal sequences which can be formed by repeating a second partial signal sequence of length n2 n1 times, in which process the first partial signal sequence (length n1) is used for modulation, and at least one of the partial signal sequences is a Golay sequence; also often termed a Golay complementary sequence. It is, thereby, possible to form signal sequences which can be determined easily when they are contained in a received signal sequence. The use of Golay sequences is advantageous, in particular, because a very effective algorithm is known for this purpose for calculating the correlation.

The present invention is also based on the findings that the use of two partial signal sequences of equal length permits correlation sums to be calculated quickly and favorably in terms of outlay.

Thus, for example, given the use of a hierarchical correlation sequence of length 256, which is constructed from 2 constituent Golay sequences of length 16, the computational outlay for the PSC (primary synchronization channel) of a UMTS system can be reduced by contrast with a conventional implementation via a Golay sequence of length 256 from 15 to 14 additions per calculated correlation output value.

However, by contrast with an orthogonal gold code used in conventional methods, the autocorrelation function of a signal sequence K(i) formed by two partial signal sequences generally has poorer autocorrelation properties. It has, for example, higher secondary maxima and a higher r.m.s. value of the secondary minima. Moreover, UMTS link level simulations show that when such signal sequences K(i) are used in PSC for slot synchronization in the case of a frequency shift (frequency error) between the transmitter and receiver the synchronization error is generally higher than when an orthogonal gold code is used.

However, complicated simulation tools created specifically for this aim could be used to determine partial signal sequence pairs (K1($j$);K2($k$)) consisting of at least one Golay sequence, on the basis of which it is possible to form signal sequences K(i) which can be reliably determined, in particular even given a higher frequency shift between the transmitter and receiver, and thus lead to a small synchronization error. In this case, a frequency shift of 10 kHz was also the starting point in the simulations from the UMTS system. The use of a signal sequence K(i) or synchronization code cp that is or can be formed in such a way substantially reduces the outlay on calculating the correlation sums, that is to say for determining the signal sequence K(i) in the receiving mobile station MS for the purpose of synchronization, without the need to accept a simultaneous increase in the synchronization error. Moreover, it is thereby possible to dispense with the use of expensive crystals in the receiver for the purpose of frequency stabilization.

In these simulations, the use of the following Golay sequences as partial signal sequence prove to be particularly advantageous:

A Golay sequence $X_n(k)$ of length nx=16, which can be formed using the following relationship:

$X_0(k)=\delta(k)$
$X'_0(k)=\delta(k)$
$X_n(k)=X_{n-1}(k)+W_n \cdot X'_{n-1}(k-D_n)$
$X'_n(k)=X_{n-1}(k)-W_n \cdot X'_{n-1}(k-D_n)$
  k=0, 1, 2, . . . , $2^{NX}-1$
  n=1, 2, . . . , NX
  $D_n=2^{P_n}$ where
  nx=$16=2^{NX}$
  NX=4
  $\delta(k)$ Kronecker delta function,
    the permutation $P_1, P_2, P_3, P_4$ and unit variable $W_1, W_2, W_3, W_4$ used to form a partial signal sequence being taken from the following set of permutation/unit variable pairs $(P_1, P_2, P_3, P_4, W_1, W_2, W_3, W_4,)$:
  3201, +1−1+1+1; 3201, −1−1+1+1; 3201, +1−1−1+1; 3201, −1−1−1+1; 3201, +1 −1+1−1; 3201, −1−1+1−1; 3201, +1−1−1−1; 3201, −1−1−1−1; 1023, +1+1−1+1; 1023, −1+1−1+1; 1023, +1−1−1+1; 1023, −1−1−1+1; 1023, +1+1−1−1; 1023, −1+1−1−1; 1023, +1−1−1−1; 1023, −1−1−1−1.

A specific development of the present invention provides that the permutation $P_1, P_2, P_3, P_4$ and unit variable $W_1, W_2, W_3, W_4$ used to form the partial signal sequence is taken from the following set of permutation/unit variable pairs $(P_1 P_2 P_3 P_4, W_1 W_2 W_3 W_4,)$: 3201, +1−1+1+1; 3201, −1−1+1+1; 3201, −1−1+1−1; 3201, −1−1−1−1; and/or the permutation $(P_1 P_2 P_3 P_4)$ used to form the second partial signal sequence is equal to 3201. In addition, a particularly favorable variant implementation of the present invention in ASICs is thereby rendered possible.

Through knowledge concerning the partial signal sequences in the mobile station, it is possible for the calculation of correlation sums that is required to synchronize a mobile station with a base station to be carried out in the mobile station with less outlay compared with the prior art.

In a development of the present invention, partial correlation sums once calculated are stored and used to calculate further correlation sums. It is, thus, possible when calculating further correlation sums to make use of partial correlation sums already calculated and so to reduce the computational outlay enormously.

The term "received signal sequence" also can be understood as a signal sequence which is derived from a received signal by demodulation, filtering, derotation, scaling or analog-to-digital conversion, for example.

Of course, the term "determining a signal sequence" is also understood within the scope of the application as determining the temporal opposition of a signal sequence.

Additional features and advantages of the present invention are described in, and will be apparent from, the following Detailed Description of the Invention and the Figures.

BRIEF DESCRIPTION OF THE FIGURES

FIG. 3 shows a conventional method for calculating correlation sums.

FIG. 4 shows a representation of signal sequences and partial signal sequences according to the teachings of the present invention.

FIGS. 6, 7 and 8 show a schematic of a method for calculating a correlation sum.

DETAILED DESCRIPTION OF THE INVENTION

Figure 1:
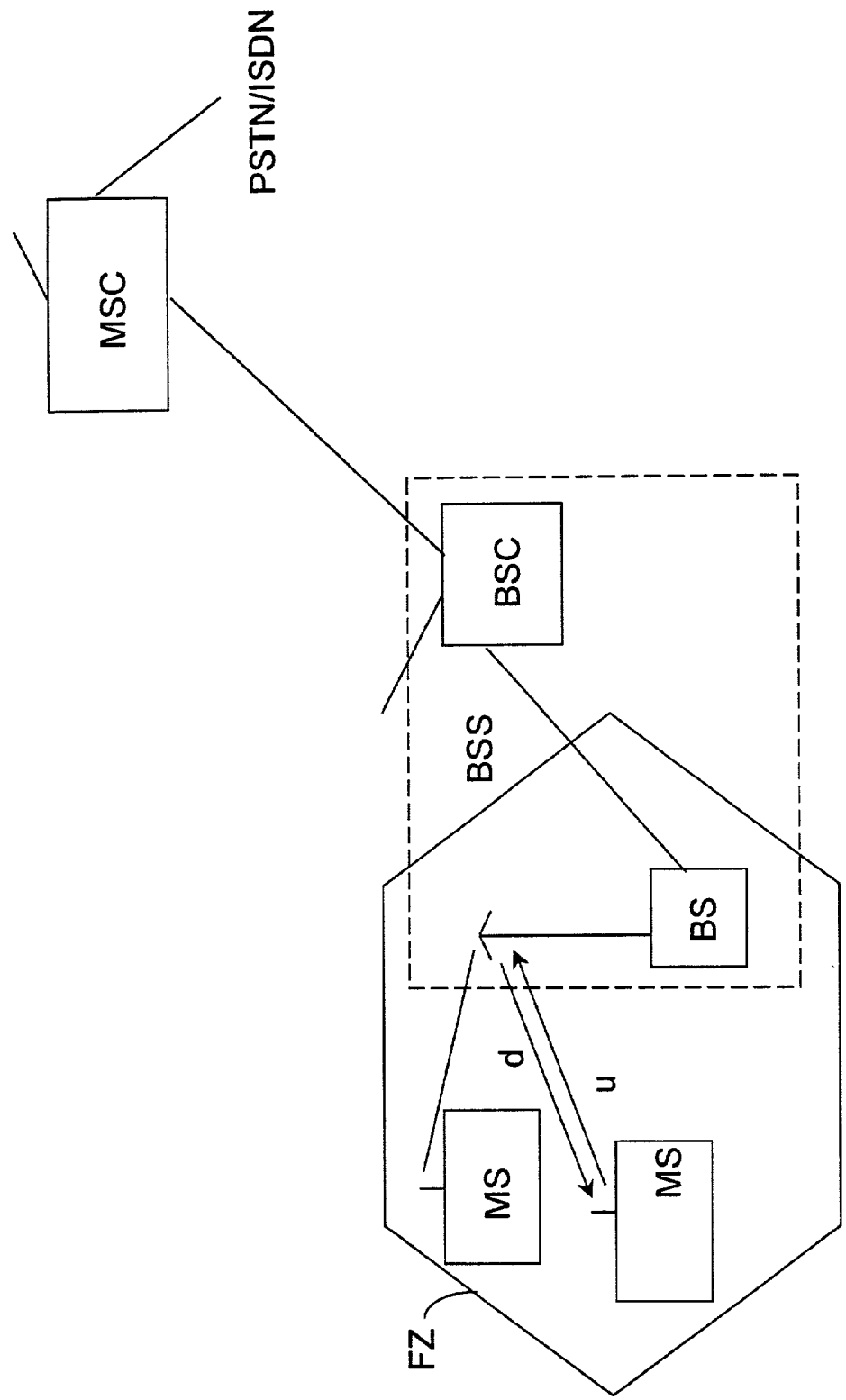
FIG. 1 shows a schematic diagram of a mobile radio network.

Illustrated in FIG. 1 is a cellular mobile radio network such as, for example, the GSM (Global System for Mobile Communication), which includes a multiplicity of mobile switching centers MSC which are networked with one another and/or provide access to a fixed network PSTN/ISDN. Furthermore, these mobile switching centers MSC are connected to, in each case, at least one base station controller BSC, which can also be formed by a data processing system. A similar architecture is also to be found in a UMTS (Universal Mobile Telecommunication System).

Each base station controller BSC is connected, in turn, to at least one base station BS. Such a base station BS is a radio station which can use an air interface to set up a radio link to other radio stations, what are termed mobile stations MS. Information inside radio channels f which are situated inside frequency bands b can be transmitted via radio signals between the mobile stations MS and the base station BS assigned to these mobile stations MS. The range of the radio signals of a base station substantially defines a radio cell FZ.

Base stations BS and a base station controller BSC can be combined to form a base station system BSS. The base station system BSS is also responsible in this case for radio channel management and/or assignment, data rate matching, monitoring the radiotransmission link, hand-over procedures and, in the case of a CDMA system, assigning the spread code set to be used, and transfers the signaling information required for this purpose to the mobile stations MS.

For FDD (Frequency-Division Duplex) systems such as the GSM, it is possible in the case of a duplex system to provide for the uplink u (mobile station (transmitting unit) to the base station (receiving unit)) frequency bands differing from those for the downlink d (base station (transmitting unit) to the mobile station (receiving unit)). A number of frequency channels f can be implemented within the different frequency bands b via an FDMA (Frequency-Division Multiple Access) method.

Within the scope of the present application, the transmission unit is also understood as a communication unit, transmitting unit, receiving unit, communication terminal, radio station, mobile station or base station. Terms and examples used within the scope of this application frequently refer also to a GSM mobile radio system; however, they are not in any way limited thereto, but can easily be mapped by a person skilled in the art with the aid of the description onto other, possibly future, mobile radio systems such as CDMA systems; in particular, wide-band CDMA systems. Data can be efficiently transmitted, separated and assigned to one or more specific connections and/or to the appropriate subscriber via an air interface via multiple access methods. It is possible to make use for this purpose of time-division multiple access TDMA, frequency-division multiple access FDMA, code-division multiple access CDMA or a combination of a plurality number of these multiple access methods.

In FDMA, the frequency band b is broken down into a number of frequency channels f; these frequency channels are split up into time slots ts via time division multiple access TDMA. The signals transmitted within a time slot ts and a frequency channel f can be separated via spread codes, what is termed CDMA codes cc, that are modulated in a link-specific fashion onto the data.

The physical channels thus produced are assigned to logic channels according to a fixed scheme. The logic channels are physically distinguished into two types: signaling channels (or control channels) for transmitting signaling information (or control information) and, traffic channels (TCH) for transmitting useful data.

The signaling channels are further subdivided into:
broadcast channels
common channels
dedicated/access control channels DCCH/ACCH The group of broadcast channels includes the broadcast control channel BCCH, to which the MS receives radio information from the base station system BSS, the frequency correction channel FCCH and the synchronization channel SCH. The common control channels include the random access channel RACH. The bursts or signal sequences that are transmitted to implement these logic channels can include in this case for different purposes signal sequences K(i), what are termed correlation sequences, or signal sequences K(i) can be transmitted on these logic channels for different purposes. A method for synchronizing a mobile station MS with a base station BS is explained below by way of example. During a first step of the initial search for a base station or search for a cell (initial cell search procedure), the mobile station uses the primary synchronization channel (SCH (PSC)) in order to achieve a time slot synchronization with the strongest base station. This can be ensured via a matched filter or an appropriate circuit which is matched to the primary synchronization code cp that is emitted by all the base stations. In this case, all the base stations BS emit the same primary synchronization code cp of length 256.

The mobile station uses correlation to determine from a received sequence the received signal sequences K(i), using a principle which is explained in FIGS. 6 to 11 and the associated description. In this case, peaks are output by the output of a matched filter for each received signal sequence of each base station located within the reception area of the mobile station. The detection of the position of the strongest peak permits the determination of the timing of the strongest base station modulo of the slot length. In order to ensure a greater reliability, the output of the matched filter can be accumulated over the number of time slots in the non-coherent fashion. The mobile station therefore carries out a correlation over a signal sequence of length 256 chips as a matched-filter operation.

Figure 5:
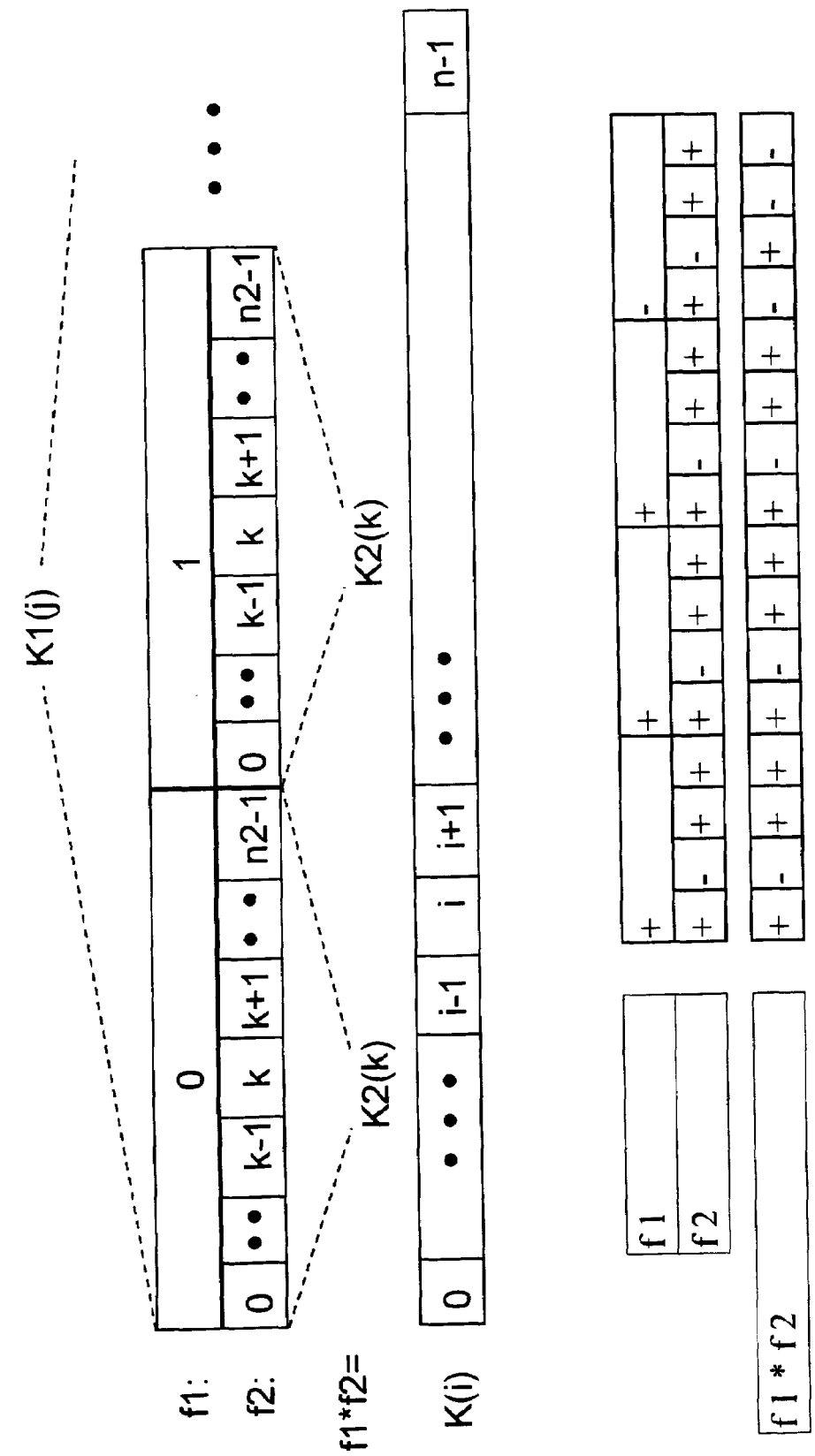
FIG. 5 shows a schematic for the formation of the signal sequence according to the teachings of the present invention.

The synchronization code cp is formed in this case in accordance with a signal sequence K(i) using a principle as explained in FIG. 5 and the associated description, or can be formed in such a way or can be obtained in such a way. The signal sequence K(i) or the synchronization code cp of length 256 is formed in this case from two partial signal sequences K1($j$), K2($k$), of length 16 in each case, or can be formed in such a way. These partial signal sequences form a partial signal sequence pair (K1($j$); K2($k$)) in this case.

A signal sequence K(i) obtainable in such a way can also be termed in this case a "hierarchical signal sequence" or "hierarchical correlation sequence". A partial signal sequence can also be termed a "short correlation sequence" or "constituent sequence".

In this case, at least one partial signal sequence is a Golay sequence, also termed a Golay complementary sequence of length nx, denoted here by $X = X_{NX}(k)$. X can be formed using the following relationship:

$X_0(k) = \delta(k)$
$X'_0(k) = \delta(k)$
$X_n(k) = X_{n-1}(k) + W_n \cdot X'_{n-1}(k - D_n)$
$X'_n(k) = X_{n-1}(k) - W_n \cdot X'_{n-1}(k - D_n)$
  k 0, 1, 2, . . . , $2^{NX} - 1$
  n = 1, 2, . . . , NX
  $D_n = 2^{P_n}$ where
  nx = $2^{NX}$
  $\delta(k)$ Kronecker delta function
  $P_n$, n = 1, 2, . . . NX; arbitrary permutation of the numbers {0, 1, 2, . . . , NX},
  $W_n$ weights for the partial signal sequence (+1, −1, +i or −i).

A method of Golay and Sivaswamy for generating Golay sequences as such is also known from "Efficient Pulse compressor for Golay Complementary Sequences", Electronic Letters Vol. 27, No. 3, pp. 219.

$W_n$ can, therefore, assume the values +1, −1, +i or −i, or, in particular, assume the values +1 or −1 for the purpose of generating binary Golay sequences.

Within the scope of the present application, W, is also denoted as a unit variable. The set of the variables $D_n$, used for a Golay sequence, which can be calculated from the permutation $P_n$, is also denoted as delay matrix; the set of the selected weights $W_n$, is also denoted as a weight matrix.

For example, W = [1, −1, 1, 1] can be selected for the unit variable and/or the weights of the weight matrix, which means that $W_1 1$; $W_2 = -1$; $W_3 = 1$; $W_4 = 1$ and for the delay matrix D = [8, 4, 1, 2], which means that $D_1 = 8 = 2^3 = 2^{P1}$; $D_2 = 4 = 2^2 = 2^{P2}$; $D_3 = 1 = 2^0 = 2^{P3}$; $D_4 = 2 = 2^1 = 2^{P4}$. The permutation or permutation matrix P = [3; 2; 0; 1] yields the partial signal sequence $X_4 = (1\ 1\ 1\ -1\ -1\ 1\ -1\ -1\ 1\ 1\ -1\ 1\ -1\ 1\ 1)$. This sequence can be used as one of the partial signal sequences such as K1($j$), for example.

By contrast with an orthogonal gold code used in conventional methods, the autocorrelation function of a signal sequence K(i) formed by two partial signal sequences generally has poorer autocorrelation properties. It has, for example, higher secondary maxima and a higher r.m.s. value of the secondary minima. Moreover, UMTS link level simulations show that when such signal sequences K(i) are used in PSC for slot synchronization in the case of a frequency shift (frequency error) between the transmitter and receiver the synchronization error is generally higher by contrast with the use of an orthogonal gold code.

However, complicated simulation tools created specifically for this aim could be used to determine partial signal sequence pairs (K1($j$); K2($k$)) consisting of at least one Golay sequence, on the basis of which it is possible to form signal sequences K(i) which can be reliably determined, in particular, for synchronization between the base station and mobile station even in the case of a relatively high frequency shift between the transmitter and receiver, and thus lead to a small synchronization error. In this case, a frequency shift of 10 kHz was also the starting point in the simulations for the UMTS system. The use of a signal sequence K(i) or synchronization code cp that is or can be formed in such a way substantially reduces the outlay on calculating the correlation sums, that is to say on determining the signal sequence K(i) in the receiving mobile station MS for the purpose of synchronization, without the need to accept a simultaneous increase in the synchronization error. Moreover, it is also possible to dispense with the use of expensive crystals in the receiver for the purpose of frequency stabilization.

The calculation of the autocorrelation function as a function of the frequency error proved to be particularly suitable in the case of the simulations for the purpose of assessing the synchronization properties of a signal sequence K(i) formed by a permutation-unit variable pair.

The calculation of the autocorrelation function taking account of a frequency shift between the transmitting and receiving units can also be carried out in this case in accordance with the following formula:

$$a(\kappa) = ABS\left(\sum_{i=0}^{n-1-\kappa} K(i) \cdot [K(i+\kappa) \cdot \exp(j \cdot 2\pi \cdot f_d \cdot i \cdot t_a)]^*\right)$$

$\kappa$    shift
$n$    length of the sequence
$i$    index
$f_d$    frequency shift
$t_a$    sampling interval
$[\ ]^*$    denotes the complex conjugate In this case, the values $a(\kappa)$ can be calculated for $\kappa=0 \ldots n-1$. If the result is a number of partial signal sequence pairs which lead to an equally good ratio of principal maximum to the maximum secondary maximum in the autocorrelation function of the resulting signal sequence K(i), the partial signal sequence pairs which lead to a lower r.m.s. value of the secondary maxima can be selected in what follows. In this case, the ratio of the principal maximum to the maximum secondary maximum is to be as large as possible, and the r.m.s. value of the secondary minima is to be as small as possible. By using subsequent link level simulations on the UMTS system, for example, it is possible to determine partial signal sequence pairs which in the case of frequency errors of 0 kHz and 5 KHz and 10 kHz surprisingly behave with regard to the synchronization error as effectively as a conventional orthogonal gold code, which is not hierarchically designed and is known to have very good properties for synchronization.

In addition to the autocorrelation function, the following criteria can also be used to select partial signal sequence pairs (K1(j);K2(k)):

Missed detection rate: select the partial signal sequence pairs by comparing the missed detection rate when carrying out complete simulations.

Detection probabilities for a given frequency error and a given SNR in the case of AWGN channels.

It was possible using the complicated simulations to determine a set of Golay sequences of length 16, described by a set of permutation/unit variable pairs which is specified in one and/or more of claims 1, 2, 3 or 4 on the basis of which it is possible to form signal sequences K(i) which have a small synchronization error both for a frequency shift of zero between the transmitter and receiver and for a larger frequency shift in the case of use for synchronization purposes. This leads to a preferred selection of permutation/unit variable pairs from which partial signal sequences and, finally, signal sequences K(i) can be obtained or formed.

In one variant design of the present invention, at least one partial signal sequence is a Golay sequence in particular of length 16, optimized with regard to the secondary maxima of the autocorrelation function even in the case of frequency errors.

It turned out to be advantageous, in the case of the simulations explained above, to use a signal sequence K(i) based on a partial signal sequence, the permutation $P_1$, $P_2$, $P_3$, $P_4$ and complex unit variable $W_1$, $W_2$, $W_3$, $W_4$ used to form the partial signal sequence being taken from the following set of permutation/unit variable pairs ($P_1$, $P_2$, $P_3$, $P_4$, $W_1$, $W_2$, $W_3$, $W_4$,):

0213,+j+j+j−1; 0213,−j+j+j−1; 0213,+1−j+j−1; 0213,−1−j+j−1;

0213,+1+j−j−1; 0213,−1+j−j−1; 0213,+j−j−j−1; 0213,−j−j−j−1;

0213,+j+j+j+1; 0213,−j+j+j+1; 0213,+1−j+j+1; 0213,−1−j+j+1;

0213,+1+j−j+1; 0213,−1+j−j+1; 0213,+1−j−j+1; 0213,−j−j−j+1;

3120,+1−j+j−1; 3120,−1−j+j−1; 3120,+1+j−j−1; 3120,−1+j−j−1;

3120,+1+j+j+j; 3120,−1−j+j+j; 3120,+1−j−j+j; 3120,−1−j−j+j;

3120,+1+j+j−j; 3120,−1+j+j−j; 3120,+1−j−j−j; 3120,−1−j−j−j;

3120,+1−j+j+1; 3120,−1−j+j+1; 3120,+1−j−j+1; 3120,−1+j−j+1;

It proved to be particularly advantageous in the case of the simulations explained above to use a signal sequence K(i) based on a partial signal sequence, the permutation $P_1$, $P_2$, $P_3$, $P_4$ and binary unit variable $W_1$, $W_2$, $W_3$, $W_4$ used to form the partial signal sequence being taken from the following set of permutation/unit variable pairs ($P_1$, $P_2$, $P_3$, $P_4$, $W_1$, $W_2$, $W_3$, $W_4$):

3201, +1−1+1+1; 3201, −1−1+1+1; 3201, +1−1−1+1; 3201, −1−1−1+1; 3201, +1 −1+1−1; 3201, −1−1+1−1; 3201, +1−1−1−1; 3201, −1−1−1−1; 1023, +1+1−1+1; 1023, −1+1−1+1; 1023, +1−1−1+1; 1023, −1−1−1+1; 1023, +1+1−1−1; 1023, −1+1−1−1; 1023, +1−1−1−1; 1023, −1 −1−1−1.

It proved to be particularly advantageous in the case of the simulations explained above to use a signal sequence K(i) based on a partial signal sequence, the permutation $P_1$, $P_2$, $P_3$, $P_4$ and binary unit variable $W_1$, $W_2$, $W_3$, $W_4$ used to form the partial signal sequence being taken from the following set of permutation/unit variable pairs ($P_1$, $P_2$, $P_3$, $P_4$, $W_1$, $W_2$, $W_3$, $W_4$):

3201, +1−1+1+1; 3201, −1−1+1+1; 3201, −1−1+1−1; 3201, +1−1−1−1; and the permutation ($P_1$, $P_2$, $P_3$, $P_4$) used to form the second partial signal sequence is equal to 3201.

As already explained above, in addition to the permutation/unit variable representation, it is also possible to represent the Golay sequences by specifying the delay matrix and the weight matrix. The sequence with real weights which is specified as particularly advantageous in the first place above, the sequence (3201,+1−1+1+1) specified by the parameters ($P_1$, $P_2$, $P_3$, $P_4$, $W_1$, $W_2$, $W_3$, $W_4$) is therefore defined by the delay matrix D=[8, 4, 1, 2] and the weight matrix W=[1, −1, 1,1].

Furthermore, the Golay sequence can also be represented explicitly by specifying the individual elements, the result for the above-named Golay sequence of length 16 being in this case:

K1=<+1,+1,+1,−1,−1,+1,−1,−1,+1,−1,+1,−1,+1, +1>

A further equivalent representation follows in the case of the mapping from +1 to 0 and −1 to 1 that is frequently used in the literature. The sequence is then defined by:

<0,0,0,1,1,0,1,1,0,0,0,1,0,1,0,0>

Thus, if Golay sequences of length 16 are used as partial signal sequences (constituent sequences) for the PSC of UMTS, $W_n$=1,−1, i −i being permitted as weights, an arbitrary permutation from $D_n$={1,2,4,8} being permitted as delays, the result is more than $2_{12}$ different possibilities for each of the two constituent sequences, that is to say a total of $2_{24}$ possibilities. In accordance with certain embodiments, the present invention includes approximately 10 to 10^2 permutation/unit variable pairs. The selected permutation/ unit variable pairs therefore form only a very small subset of the fundamentally possible set of permutation/unit variable pairs that can be used to form 16-digit Golay sequences.

Figure 2:
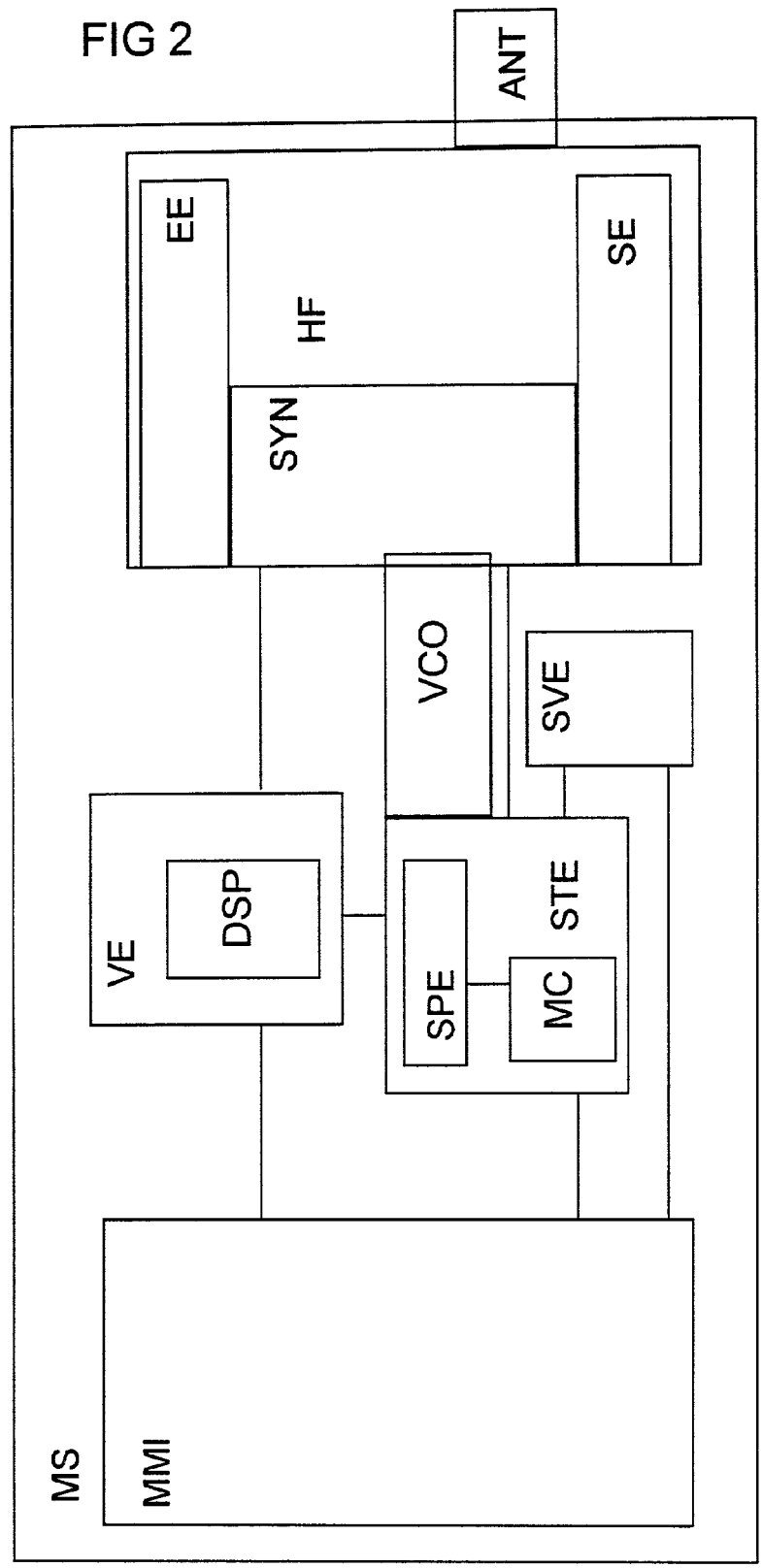
FIG. 2 shows a radio station which can be a mobile station MS, consisting of an operating unit or interface unit MMI, a control device STE, a processing device VE, a power supply device SVE, a receiving device EE and, if appropriate, a transmitting device SE.

FIG. 2 shows a radio station which can be a mobile station MS, consisting of an operating unit or interface unit MI, a control device STE, a processing device VE, a power supply device SVE, a receiving device EE and, if appropriate, a transmitting device SE.

The control device STE essentially includes a program-controlled microcontroller MC, which can access memory chips SPE by writing and reading. The microcontroller MC controls and monitors all essential elements and functions of the radio station.

The processing device VE can also be formed by a digital signal processor DSP, which can, likewise, access memory chips SPE. Addition and multiplication can be effected via the processing device VE.

The program data required for controlling the radio station and the communication cycle, as well as, in particular, the signaling procedures, and information produced during the processing of signals are stored in the volatile or non-volatile memory chips SPE. Moreover, signal sequences K(i) which are used for correlation purposes, and intermediate results of correlation sum calculations can also be stored therein. The signal sequences K(i) within the scope of the present invention can be stored in the mobile station and/or the base station. It is also possible for one or more of the permutation/unit variable pairs set forth above or partial signal sequences or partial signal sequence pairs (K1(j);K2 (k)) derived therefrom to be stored in the mobile station and/or the base station. It is also possible for a signal sequence K(i) to be formed from a partial signal sequence pair (K1(j);K2(k)) and/or a partial signal sequence to be formed from a permutation/unit variable pairs in the mobile station and/or the base station.

In particular, it is possible to store in a base stations or in all the base stations in a system, a signal sequence K(i) which is emitted at fixed or variable intervals for synchronization purposes. The partial signal sequence pair (K1(j); K2(k)), from which the signal sequence K(i) stored in the base station can be formed, is stored in the mobile station MS and is used to synchronize the mobile station with a base station in order to calculate the correlation sum favorably in terms of computation outlay.

The storage of the signal sequences or the partial signal sequences can also be performed by storing appropriate information in arbitrarily coded form, and can be implemented with the aid of storage parts such as, for example, volatile and/or nonvolatile memory chips or via appropriately designed adder or multiplier inputs or appropriate hardware configurations which have the same effect.

The high-frequency section HF includes, if appropriate, the transmitting device SE, with a modulator and an amplifier V, and a receiving device EE with a demodulator and, likewise, an amplifier. The analog audio signals and the analog signals originating from the receiving device EE are converted via analog-to-digital conversion into digital signals and processed by the digital signal processor DSP. After processing, the digital signals are converted, if appropriate, by digital-to-analog conversion into analog audio signals or other output signals and analog signals that are to be fed to the transmitting device SE. Modulation or demodulation, respectively, is carried out for this purpose, if appropriate.

The transmitting device SE and the receiving device EE are fed with the frequency of a voltage-controlled oscillator VCO via the synthesizer SYN. The system clock for timing processor devices of the radio station can also be generated via the voltage-controlled oscillator VCO.

An antenna device ANT is provided for receiving and for transmitting signals via the air interface of a mobile radio system. The signals are received and transmitted in what are termed bursts that are pulsed over time in the case of some known mobile radio systems such as the GSM (Global System for Mobile Communication).

The radio station may also be a base station BS. In this case, the loudspeaker element and the microphone element of the operating unit MMI are replaced by a link to a mobile radio network; for example, via a base station controller BSC or a switching device MSC. The base station BS has an appropriate multiplicity of transmitting and receiving devices, respectively, in order to exchange data simultaneously with a number of mobile stations MS.

Figure 3:
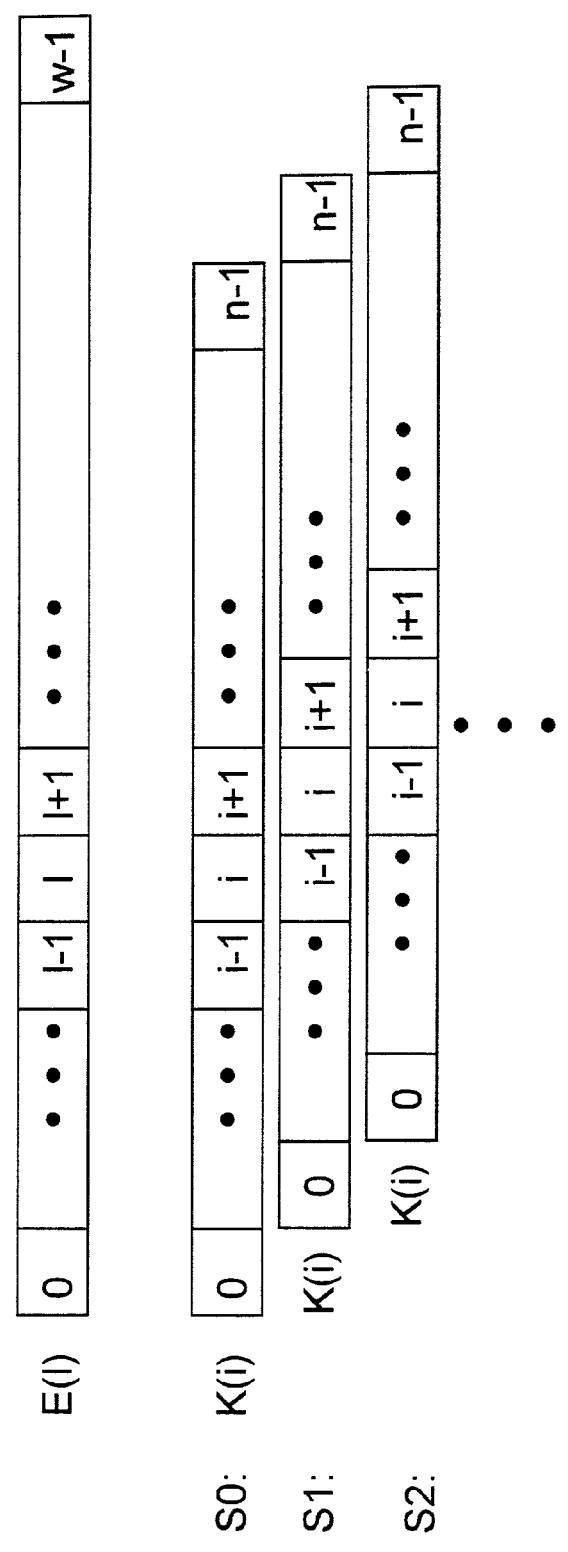

The received signal sequence E(1), which can also be a signal sequence derived from a received signal, of length w is illustrated in FIG. 3. In order to calculate a first correlation sum S0 in accordance with the formula specified at the beginning, elements of a first section of this received signal sequence E(1) are multiplied in pairs by the corresponding elements of the signal sequence K(i) of length n, and the length of the resulting partial results is added to the correlation sum S0.

In order to calculate a further correlation sum S1, as illustrated in the FIG. 3, the signal sequence K(i) is shifted to the right by one element, and the elements of the signal sequence K(i) are multiplied in pairs by the corresponding elements of the signal sequence E(1), and the correlation sum S1 is formed again by summing the partial results produced.

The pairwise multiplication of the elements of the signal sequence by corresponding elements of the received signal sequence, and the subsequent summation can also be described in vector notation as the formation of a scalar product, if the elements of the signal sequence and the elements of the received signal sequence are respectively aligned to form a vector of a Cartesian coordinate system:

$$S0 = \begin{pmatrix} K(0) \\ \vdots \\ K(i) \\ \vdots \\ K(n-1) \end{pmatrix} * \begin{pmatrix} E(0) \\ \vdots \\ E(i) \\ \vdots \\ E(n-1) \end{pmatrix}$$

$$= K(0)*E(0) + \ldots + K(i)*E(i) + \ldots + K(n-1)*E(n-1)$$

$$S1 = \begin{pmatrix} K(0) \\ \vdots \\ K(i) \\ \vdots \\ K(n-1) \end{pmatrix} * \begin{pmatrix} E(1) \\ \vdots \\ E(i+1) \\ \vdots \\ E(n) \end{pmatrix}$$

$$= K(0)*E(1) + \ldots + K(i)*E(i+1) + \ldots + K(n-1)*E(n)$$

In the correlation sums S thus determined, it is possible to search for the maximum and compare the maximum of the correlation sums S with a prescribed threshold value and thus determine whether the prescribed signal sequence K(i) is included in the received signal E(1) and if so where it is located in the received signal E(1) and thus two radio stations are synchronized with one another or data are detected on to which an individual spread code has been modulated in the form of a signal sequence K(i).

Figure 4:
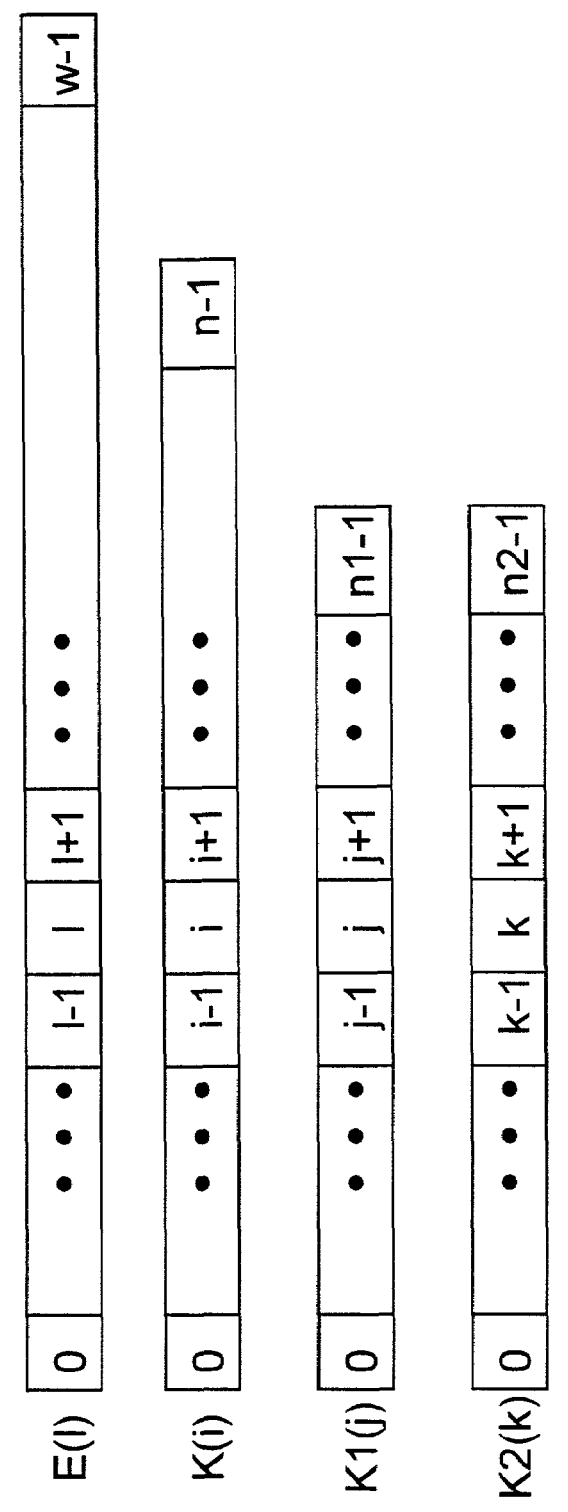

Represented again in FIG. 4 is the received signal sequence E(1) and, as correlation sequence a signal sequence K(i) which is based on the partial signal sequences K1(j), K2(k).

Represented in FIG. 5 is the formation of a signal sequence K(i) which is based on two partial signal sequences K2(k) of length n2 and K1(j) of length n1. For this purpose, the partial signal sequence K2(k) is repeated n1 times and modulated in the process by the partial signal sequence K1(k). The formation of the signal sequence K(i) can also be expressed mathematically by the following formula:

$K(i)=K2(i \bmod n2)*K1(i \operatorname{div} n2)$, for $i=0\ldots n1*n2-1$ mod denotes the integral remainder of a division, and div denotes the integral result of a division.

This is illustrated by a sequence f2 which consists of the repeated, sequentially mapped partial signal sequences K2(k), and a sequence f1 which is mapped by an extended partial signal sequence K1(j) over the sequence f2.

The new signal sequence K(i) of length n is produced by multiplying the elements of the sequence f2 by the corresponding elements, mapped over the sequence f2, of the sequence f1. This generation of a signal sequence K(i) is represented once again at the bottom of the illustration with the aid of an example of two binary partial signal sequences of length 4.

The present invention is not, of course, limited to partial signal sequences of length 4 or signal sequences of length 16. Neither is the present invention limited to the mathematical description used above.

For example, the following representation for partial signal sequences of length 16 or signal sequences of length 256 correspond in content to the mathematical representation used above, and is likewise contained in the present invention:

For example, if use is made for K1 of the Golay sequence, described above as particularly favorable, with the permutation/unit variable representation (3201, +1−1+1+1) or the explicit representation <+1,+1,+1,−1,−1,+1,−1,−1,+1,+1,+1,−1,+1−1,+1,+1>, and for K2 of a sequence a consisting of 16 elements, it is also possible to write the repeated, sequentially mapped partial signal sequences K2 and a, which are modulated with the value of the respective element of the sequence K1, as follows:

K=<a, a, a, −a, −a, a, −a, −a, a, a, a,−a, a, −a, a, a>

Signal sequences K(i) formed in such a way can be used for simplified calculation of correlation sums of these signal sequences K(i) with received signal sequences E(1). The signal sequence of length 256 thus formed can, for example, be emitted for synchronization purposes as primary synchronization code cp of length 256.

Figure 7:
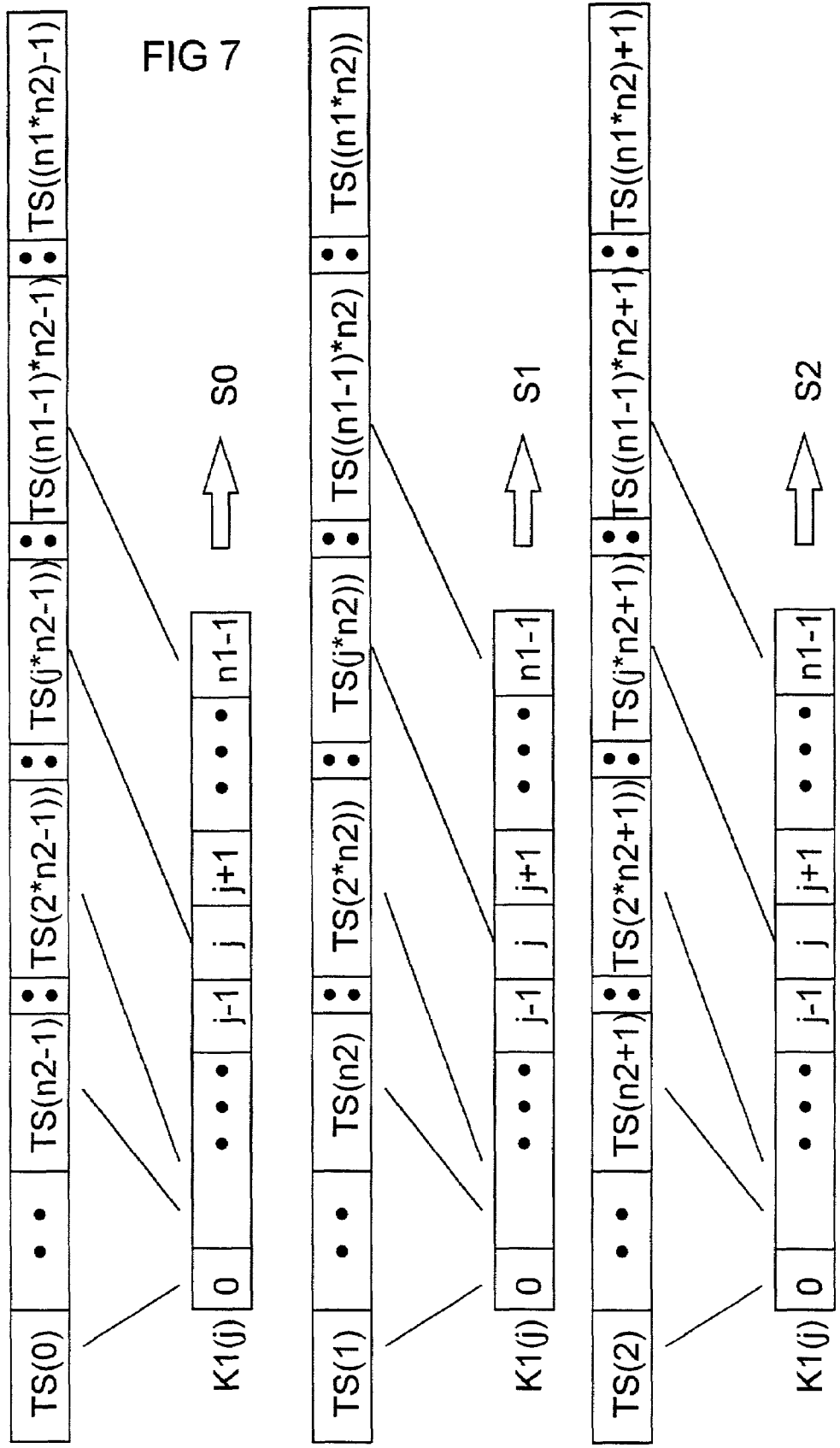
Figure 8:
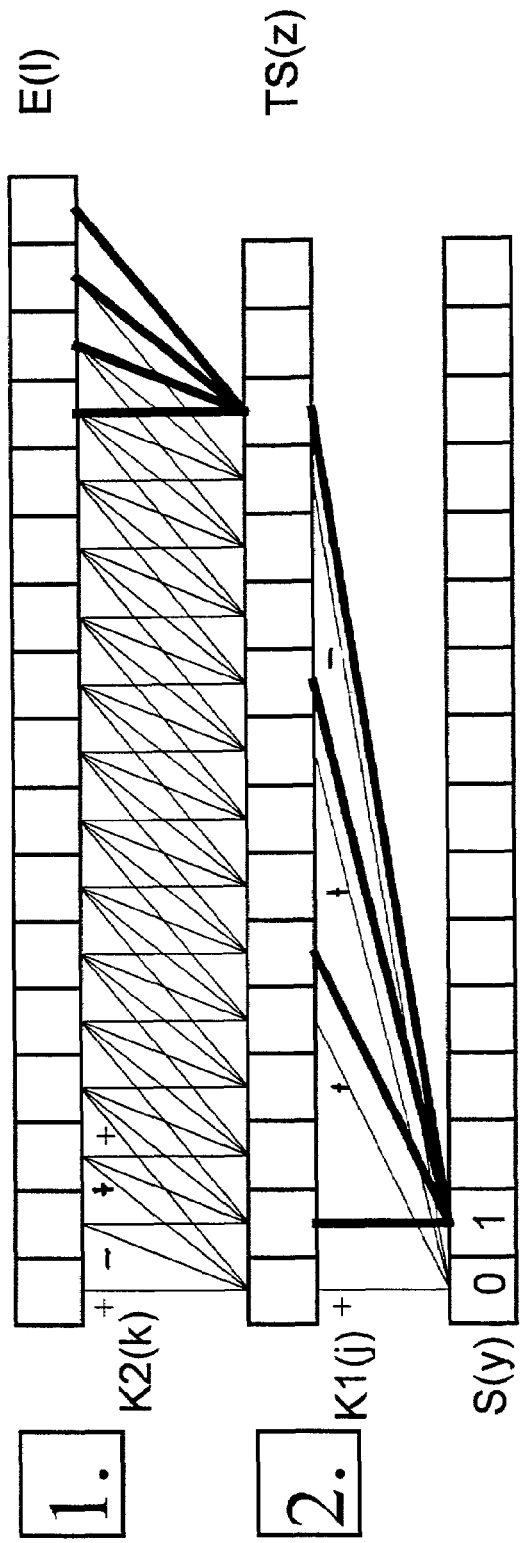

A schematic of such a simplified calculation of correlation sums S which is, therefore, also faster and more favorable in terms of outlay, is represented in FIGS. 6 to 8, which are examined below.

The first step is to form a partial correlation sum TS(z). For this purpose, for example, the correlation sum of the second partial signal sequence K2(k) with the corresponding section of the received signal sequence E(1) is formed for the first element of the partial correlation sequence TS(0).

$$TS(0) = \begin{pmatrix} K2(0) \\ \vdots \\ K2(k) \\ \vdots \\ K2(n2-1) \end{pmatrix} * \begin{pmatrix} E(0) \\ \vdots \\ E(k) \\ \vdots \\ E(n2-1) \end{pmatrix}$$

$$= K2(0)*E(0) + \ldots + K2(k)*E(k) + \ldots +$$
$$K2(n2-1)*E(n2-1)$$

As illustrated, for the second element of the partial correlation sum sequence TS(1) the second partial signal sequence K2(k) is shifted by one element, and the correlation sum with the corresponding element of the received signal sequence E(1) is likewise formed, etc.

$$TS(1) = \begin{pmatrix} K2(0) \\ \vdots \\ K2(k) \\ \vdots \\ K2(n2-1) \end{pmatrix} * \begin{pmatrix} E(1) \\ \vdots \\ E(k+1) \\ \vdots \\ E(n2) \end{pmatrix}$$

$$= K2(0)*E(1) + \ldots + K2(k)*E(k+1) + \ldots +$$
$$K2(n2-1)*E(n2)$$

The n-th element of the partial correlation sum sequence TS(n1*n2−1) is calculated correspondingly after n−1 shifts of the second partial signal sequence K2(k) with respect to the received signal sequence E(1).

$$TS(n-1) = \begin{pmatrix} K2(0) \\ \vdots \\ K2(k) \\ \vdots \\ K2(n2-1) \end{pmatrix} * \begin{pmatrix} E(n-1) \\ \vdots \\ E(k+n-1) \\ \vdots \\ E(n2+n-2) \end{pmatrix}$$

$$= K2(0)*E(n-1) + \ldots + K2(k)*E(k+n-1) + \ldots +$$

$$K2(n2-1) * E(n2+n-2)$$

The partial correlation sum sequence TS(z) thus produced is represented at the top in FIG. 7. Each n2-th element is now selected from this partial correlation sum sequence and multiplied by the corresponding element of the first partial signal sequence K1(j) in pairs.

Combining the selected elements of the partial correlation sum sequence TS(z) and the first partial signal sequence K1(k) to form vectors in each case produces the first correlation sum S0 via the scalar product of these two vectors.

$$S0 = \begin{pmatrix} K1(0) \\ \vdots \\ K1(j) \\ \vdots \\ K1(n1-1) \end{pmatrix} * \begin{pmatrix} TS(0) \\ \vdots \\ TS(j*n2-1) \\ \vdots \\ TS((n1-1)*n2-1) \end{pmatrix}$$

$$= K1(0)*TS(0) + \ldots + K1(j)*TS(j*n2-1) + \ldots$$

FIG. 7 shows at the bottom the corresponding calculation of further correlation sums S1 and S2, respectively, through the selection of n2-th elements situated one or two to the right of the initially selected elements:

$$S1 = \begin{pmatrix} K1(0) \\ \vdots \\ K1(j) \\ \vdots \\ K1(n1-1) \end{pmatrix} * \begin{pmatrix} TS(1) \\ \vdots \\ TS(j*n2) \\ \vdots \\ TS((n1-1)*n2) \end{pmatrix}$$

$$= K1(0)*TS(0) + \ldots + K1(j)*TS(j*n2) + \ldots$$

By storing partial correlation sums TS once calculated, it is possible to have recourse to them again when later calculating further correlation sums, and thus to dispense with the corresponding computational steps.

Depending on the design variant, it is possible either firstly to calculate the complete partial correlation sum sequence TS(z) over the entire received signal sequence E(1), and then to calculate the individual correlation sums, or not to calculate the corresponding additionally required partial correlation sums until required for the purpose of calculating a new correlation sum.

FIG. 8 shows, once again, the method consisting of two steps, for calculating correlation sums S, this time with the aid of the example, represented in FIG. 5, of two binary partial signal sequences of length 4.

In a first step, the partial correlation sums TS(z) of the second partial signal sequence K2(k)+−++ are calculated with corresponding sections of the received signal sequence E(1) and, in a second step, each fourth element of the partial correlation sum sequence TS(z) thus produced is then selected, multiplied by the corresponding element of the first partial signal sequence K1(j)+++−, and summed to form the correlation sequence S0.

The bold lines in this case represent the calculation steps that have to be carried out anew for calculation of a further correlation sum S1 for the case in which the remaining partial correlation sums TS have already previously been calculated and stored.

This variant design can be carried out as efficiently as possible in terms of storage if each n2-th partial correlation sum is firstly calculated. The samples are buffered for this purpose.

Figure 9:
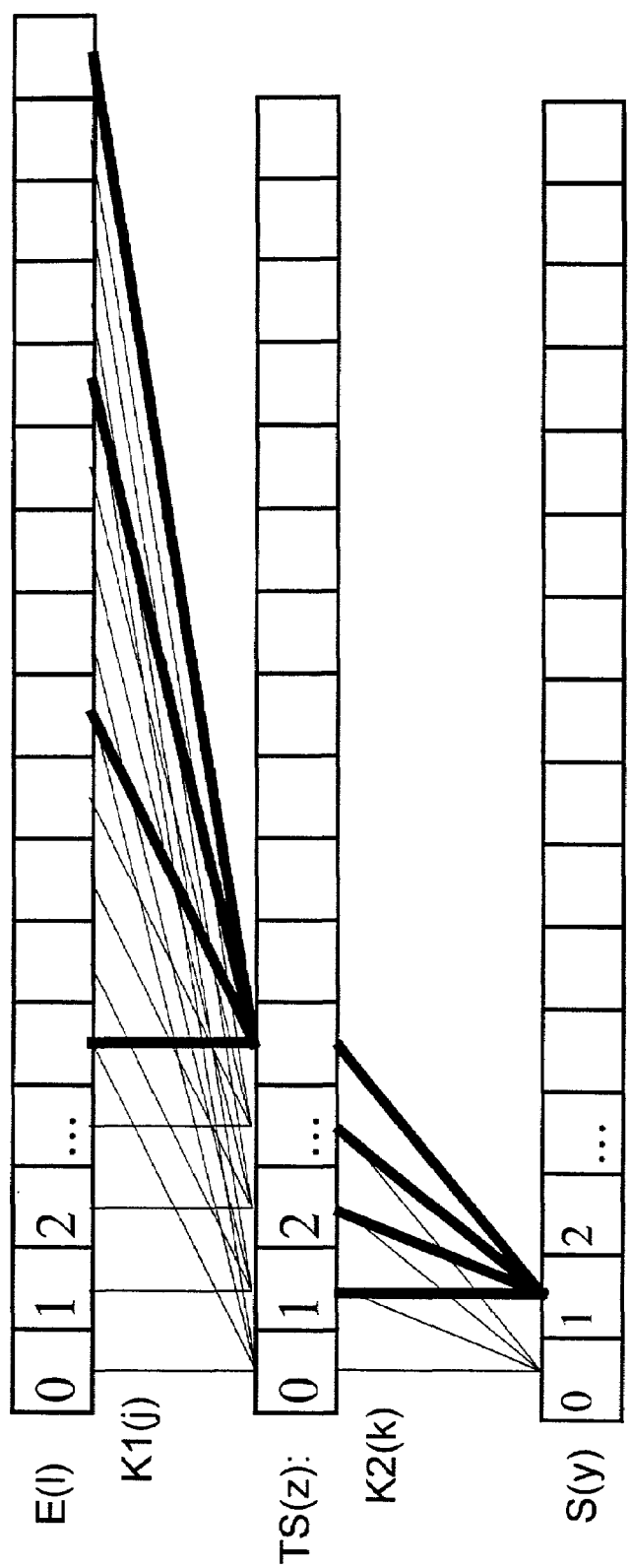
FIGS. 9 and 10 show a schematic of a variant design of a method for forming the correlation sum.
Figure 10:
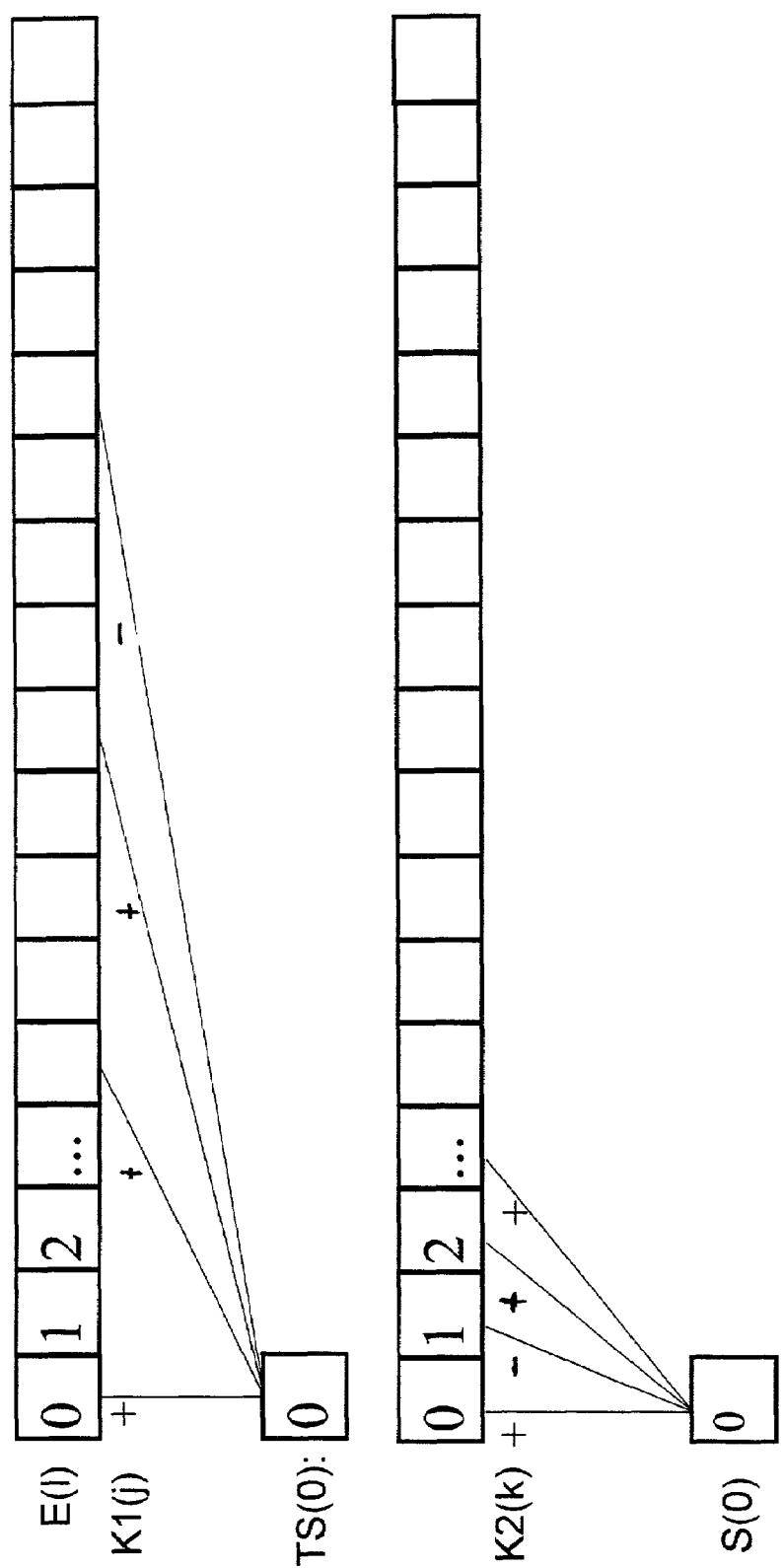

FIGS. 9 to 10 present another variant design for simplified calculation of correlation sums S with the aid of the example, already mentioned above, of two binary partial signal sequences of length 4.

The first step here is to select each 4th element of the received signal sequence E(1) and to form the partial correlation sum sequence TS(z) of the elements thus selected with the partial signal sequence K1(k). Four sequential elements are respectively selected from the partial correlation sum sequence TS(z) thus produced and multiplied in pairs by corresponding elements of the partial signal sequence K2(k), and the resulting partial results are summed to form the correlation sum S. Once again, here, the bold lines represent the additionally required steps for calculating a further correlation sum S1 for the case in which the other partial correlation sums TS have already been calculated and stored before.

FIG. 10 shows, once again, the calculation of a first correlation sum S0, in the case of which, firstly, each 4th element of the received signal sequence E(1) is selected, these elements are multiplied by corresponding elements of the first partial signal sequence K1(k)+++−, and the partial correlation sum TS(0) is calculated by summing the partial results. In a second step, the first 4 sequential elements of the partial correlation sum sequence TS(z) are multiplied by the corresponding elements of the second partial signal sequence K2(k)+−++, and the partial results produced are summed to form the correlation sum S0.

This variant design requires less storage for buffering the partial correlation sums when the sums are calculated successively.

A further refinement of the present invention utilizes the regular (fast periodic) structure, caused by the regular design principle of the signal sequence K(i), of the aperiodic autocorrelation function of this signal sequence. As such when a signal is being sought, not only is a principal maximum produced, but secondary maxima also occur at regular intervals. The regularity of the position of the maxima can be utilized to accelerate the search for the signal sequence in the received signal sequence. As soon as a secondary maxima has been found, it is possible to predict the position of the other maxima on the basis of the periodicity. That is to say the correlation sum is calculated only at these points. The principal maximum can be detected quickly in this way. However, the supposed secondary maximum can also be only a randomly increased value (because of the noise component). In this case, no maximum will actually be found at the potential points of the expected principal maximum. Consequently, the hypothesis is rejected in this case and the calculation is continued conventionally.

However, the regularity, caused by the design principle of the signal sequences, of the secondary maxima can also be utilized to eliminate and correct interfering secondary maxima in the correlation result. After the detection of the maximum, the secondary maxima can be calculated therefrom and this value can be subtracted from the corresponding correlation results. The correlation result of a (hypothetical) sequence with a perfect autocorrelation function is obtained in this way. This results in a greatly simplified calculation owing to the regularity of the secondary maxima.

In various embodiments of the present invention, efficient Golay correlators are used to calculate scalar products, correlation sums and/or partial correlation sums.

Figure 11:
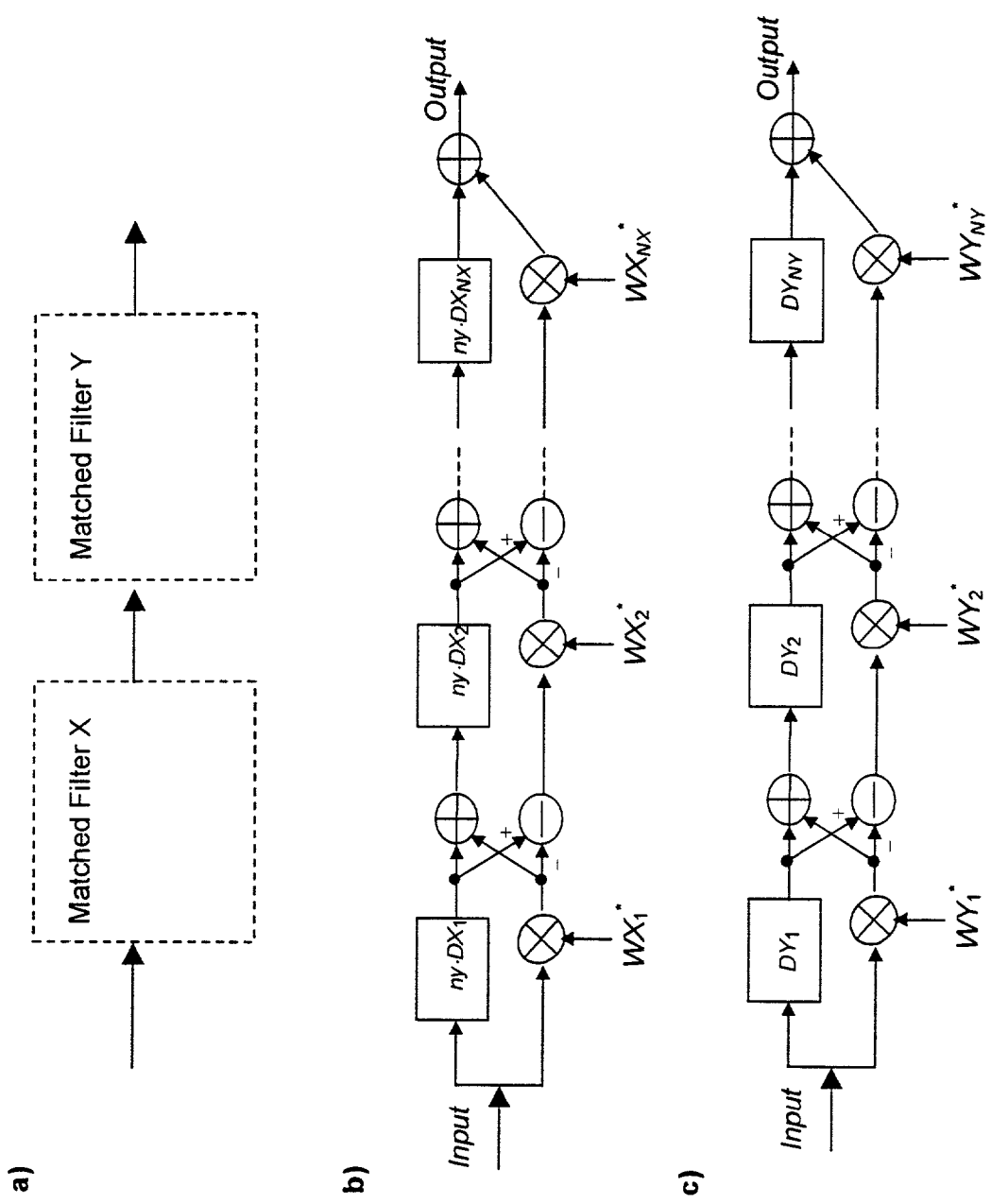
FIG. 11 shows a block diagram of an efficient hierarchical Golay correlator.

FIG. 11 shows an efficient hierarchical correlator for signal sequences, Golay sequences X,Y of length nx and ny respectively being used as constituent sequences K1, K2. The correlator consists of two series-connected matched filters (FIG. 11a) which are respectively formed as efficient Golay correlators. FIG. 11b) shows the matched filter for the sequence X, and FIG. 11c) shows the matched filter for the sequence Y.

The following designations apply in FIG. 11b):

n=1, 2, . . . NX
ny length of sequence Y
nx length of sequence X
NX with nx=$2^{NX}$
$DX_n$ $DX_n=2^{PX_n}$
$PX_n$ permutation of the numbers {0, 1, 2, . . . , NX−1} for the partial signal sequence X
$WX_n$ weights for the partial signal sequence X from (+1,−1,+i or −i).

The following designations apply in FIG. 11c):

n=1, 2, . . . NY
ny length of sequence Y
NY with ny=$2^{NY}$
$DY_n$ $DY_n=2^{PY_n}$
$PY_n$ permutation of the numbers {0, 1, 2, . . . , NY−1} for the partial signal sequence Y
$WY_n$ weights for the partial signal sequence Y from (+1,−1,+i or −i)

Moreover, the following definitions and designations are valid in these variant designs:

$a_n(k)$ and $b_n(k)$ are two complex sequences of length $2^N$,
$\delta(k)$ is the Kronecker delta function
k is an integer representing time,
n is the iteration number,
$D_n$ is the delay,
$P_n$, n=1, 2, . . . , N, is an arbitrary permutation of the numbers {0, 1, 2, . . . , N−1},
$W_n$ can assume the values +1, −1, +i, −i as weights and is also designated as unit variable.

The correlation of a Golay sequence of length $2^N$ can now be carried out efficiently as follows:

The sequences $R_a(0)(k)$ and $R_b(0)(k)$ are defined as $R_a(0)(k)=R_b(0)(k)=r(k)$, r(k) being the received signal or the output of another correlation stage.

The following step is executed N times: n runs from 1 to N:

Calculate $$R_a^{(n)}(k)=W^*_n * R_b^{(n-1)}(k)+R_a^{(n-1)}(k-D_n)$$

and $$R_b^{(n)}(k)=W^*_n * R_b^{(n-1)}(k)+R_a^{(n-1)}(k-D_n),$$

$W^*_n$ designating the complex conjugate of $W_n$. If the weights W are real, $W^*_n$ is identical to $W_n$.

$R_a^{(N)}(k)$ is then the correlation sum to be calculated.

An efficient Golay correlator for a PSC code of length 256 ($2^8$) chips in the receiver generally has 2·8−1=15 complex adders. With the combination of hierarchical correlation and efficient Golay correlator, a hierarchical code, described by two constituent sequences X and Y−$_a$ of length 256 ($2^4 \cdot 2^4$) requires only 2·4−1+2·4−1=14 complex adders (even when use is made of four-valued constituent sequences). This reduces by 7% the outlay on calculation, which is very high for the primary synchronization in CDMA mobile radio systems.

Specified below, marked in each case by dividing dashes, of variant designs of the present invention the implementation of which are within the activity of a person skilled in the art given knowledge of the present application:

to form a code sequence of length $2^{NX+NY}$, two constituent Golay sequences of length nx=$2^{NX}$ and ny=$2^{NY}$ are used and are hierarchically constructed as described above.

+1 and −1 are used as weights for the constituent Golay sequences, binary sequences thereby being produced.

+1, −1, i or −i are used as weights for the constituent Golay sequences, four-valued sequences thereby being produced.

Real Golay sequences are used.

Complex Golay sequences are used.

Two constituent Golay sequences of equal length are used.

Two complementary Golay sequences are used.

Only one efficient Golay correlator, with programmable delays, if appropriate, is used for optional calculation of one or both complementary Golay sequences.

A sequence is used as described, but additional values are also inserted; these values must be accumulated as usual during the calculation. The remainder of the calculation can, however, be carried out efficiently as described. This permits the generation of sequences of arbitrary length.

Two constituent sub-sequences are used.

A number of constituent sub-sequences are used.

A Golay sequence is used only for some of the sub-sequences.

These sequences are used for the synchronization channel in UMTS.

Constituent Golay sequences optimized for frequency error are used.

Two series-connected filters are used to calculate the correlation, one being a matched filter matched to the Golay sequence X, the other being a matched filter matched to the Golay sequence Y with spread delays ny·$DX_n$.

Two series-connected filters are used to calculate the correlation, one being a matched filter matched to the Golay sequence X, and the other being a matched filter matched to the Golay sequence Y with spread delays ny·$DX_n$, and the output signals of the filters being calculated in accordance with the efficient Golay correlator algorithm.

The efficient Golay correlation algorithm is used to calculate the partial correlation sums and the algorithm for the hierarchical correlation is used to determine the overall correlation.

The present invention is not limited to radio transmission systems, but can also be employed in the use of other transmission methods, for example, acoustic method (ultrasound) in particular, for the purposes of sonography, or optical methods, for example infrared measurement using lidar principles. A further field of application is the investigation of changes in the spectral composition of backscattered signals.

Indeed, although the present invention has been described with reference to specific embodiments, those of skill in the art will recognize that changes made be made thereto without departing from the spirit and scope of the invention as set forth in the hereafter appended claims.

The invention claimed is:

1. A method for synchronizing a base station with a mobile station, the method comprising the steps of:
   forming a signal sequence K(i) at the base station, wherein the signal sequence K(i) is formed using the following rule using modulated repetition of a partial signal sequence "a" consisting of 16 elements:
   K=<a, a, a, −a, −a, a, −a, −a, a, a, a, −a, a, −a, a, a>,
   and wherein the signal sequence is further formed in accordance with the following relationship wherein a second partial signal sequence K2($k$) of length n2=16 is repeated n1=16 times and is modulated in the process with a first partial signal sequence K1($j$) of length n1=16, modulation of the second partial signal sequence K2($k$) can be obtained using the following rule:
   K(i)=K2(i mod n2)*K1(i div n2), for i=0 . . . n1*n2−1;
   forming at least one of the partial signal sequences, being a Golay sequence $X_n(k)$ of length nx=n1=16, using the following relationship:
   $X'_0(k)=\delta(k)$
   $X'_0(k)=\delta(k)$
   $X_n(k)=X_{n-1}(k)+W_n*X'_{n-1}(k-D_n)$
   $X'_n(k)=X_{n-1}(k)-W_n*X'_{n-1}(k-D_n)$,
   k=0, 1, 2, . . . , $2^{NX-1}$
   n=1, 2, . . . , NX
   $D_n=2^{Pn}$
   where
   nx=16=$2^{NX}$
   NX=4
   δ(k): Kronecker delta function,
   and wherein the permutation $P_1$, $P_2$, $P_3$, $P_4$ and unit variable $W_1$, $W_2$, $W_3$, $W_4$ can be used to form a partial signal sequence from the following set of permutation/unit variable pairs ($P_1$, $P_2$, $P_3$, $P_4$, $W_1$, $W_2$, $V_3$, $W_4$,):
   3201, +1−1+1+1; 3201, −1−1+1+1; 3201, +1−1−1+1; 3201, −1−1−1+1; 3201, +1 −1+1−1; 3201, −1−1+1−1; 3201, +1−1−1−1; 3201, −1−1−1−1; 1023, +1+1−1+1;
   1023, −1+1−1+1; 1023, +1−1−1+1; 1023, −1−1−1+1; 1023, +1+1−1−1; 1023, −1+1−1 −1; 1023, +1−1−1−1; 1023, −1−1−1−1; and
   transmitting the signal sequence K(i) from the base station to set up a synchronization with a mobile station.

2. A method for synchronizing a base station with a mobile stations as claimed in claim 1, wherein the partial signal sequence K1($j$) is a Golay sequence which is defined by the delay matrix D=[8,4,1,2] and the weight matrix W=[1,−1, 1,1].

3. A method for synchronizing a base station with a mobile station as claimed in claim 1, wherein the permutation $P_1$, $P_2$, $P_3$, $P_4$ and unit variable $W_1$, $W_2$, $W_3$, $W_4$ used to form the first partial signal sequence is taken from the following set of permutation/unit variable pairs ($P_1$, $P_2$, $P_3$, $P_4$, $W_1$, $W_2$, $W_3$, $W_4$):
   3201, +1−1+1+1; 3201, −1−1+1+1; 3201, −1−1+1−1; 3201, +1−1−1−1; and
   the permutation $P_1$, $P_2$, $P_3$, $P_4$ used to form the second partial signal sequence is equal to 3201.

4. A method for synchronizing a base station with a mobile station as claimed in claim 1, wherein the signal sequence K(i) is received by the mobile station as part of a received signal sequence and further processed for synchronization purposes.

5. A method for synchronizing a base station with a mobile station as claimed in claim 1, wherein the signal sequence K(i) is determined by the mobile station, knowledge of the first and second partial signal sequences K1($j$) K2($k$) being used in the mobile station.

6. A method for synchronizing a base station with a mobile station as claimed in claim 1, the method further comprising the steps of:
   determining correlation sums of the signal sequence K(i) with corresponding sections of the received signal sequence in the mobile station;
   calculating a partial correlation sum sequence of the partial signal sequence K2($k$) with corresponding parts of the received signal sequence; and
   selecting n1 elements of the partial correlation sum sequence to calculate a correlation sum and multiplying the n1 elements by the partial signal sequence K1($j$) to produce a scalar product.

7. A method for synchronizing a base station with a mobile station as claimed in claim 6, wherein n1 in each case n2-th elements of the partial correlation sum sequence are selected to calculate a correlation sum.

8. A method for synchronizing a base station with a mobile station as claimed in claim 1, the method further comprising the steps of:
   determining correlation sums of the signal sequence K(i) with corresponding sections of the received signal sequence in the mobile station;
   calculating a partial correlation sum sequence of the partial signal sequence K2($k$) with corresponding elements of the received signal sequence; and
   multiplying n2 elements of the partial correlation sum sequence by the partial signal sequence K2($c$) to produce a scalar product in order to calculate a correlation sum.

9. A method for synchronizing a base station with a mobile station as claimed in claim 8, wherein n1 in each case n2-th elements of the received signal sequence E(1) are selected to calculate a partial correlation sum.

10. A method for synchronizing a base station with a mobile station as claimed in claim 6, wherein calculated partial correlation sums are stored and used to calculate a further correlation sum.

11. A method for synchronizing a base station with a mobile station as claimed in claim 1, wherein an efficient Golay correlator is used in the mobile station in order to determine, at least partially, the signal sequence and to calculate at least one correlation sum.

12. A base station comprising:
   a part for storing or forming a signal sequence K(i) formed using the following formation rule using modulated repetition of a partial signal sequence "a" consisting of 16 elements:
   K=<a, a, a, −a, −a, a, −a, −a, a, a, a, −a, a, −a, a, a>,
   and wherein the signal sequence is formed in accordance with the following relationship wherein a partial second signal sequence K2($k$) of length n2=16 is repeated n1=16 times and is modulated in the process by the first partial signal sequence K1($j$) of length n1=16, the modulation of the second partial signal sequence K2($k$) can be obtained using the following rule:
   K(i)=K2(i mod n2)*K1(i div 2), for i=0 . . . n1*n2−1,
   at least one of the partial signal sequences being a Golay sequence Xn(k) of length nx=n1=16 which can be formed using the following relationship
   $X_0(k)=\delta(k)$
   $X'_0(k)=\delta(k)$
   $X_n(k)=X_{n-1}(k)+W_n*X'_{n-1}(k-D_n)$
   $X'_n(k)=X_{n-1}(k)-W_n*X'_{n-1}(k-D_n)$
   k=0, 1, 2, . . . , $2^{NX-1}$ n=1, 2, ..., NX
$D_n = 2^{P_n}$
where
$nx = 16 = 2^{NX}$
NX=4
$\delta(k)$: Kronecker delta function,
the permutation $P_1$, $P_2$, $P_3$, $P_4$ and unit variable $W_1$, $W_2$, $W_3$, $W_4$ can be used to form a partial signal sequence being taken from the following set of permutation/unit variable pairs ($P_1$, $P_2$, $P_3$, $P_4$, $W_1$, $W_2$, $W_3$, $W_4$;):
   3201, +1−1+1+1; 3201, −1−1+1+1; 3201, +1−1−1+1; 3201, −1−1−1+1; 3201, +1 −1+1−1; 3201, −1−1+1−1; 3201, +1−1−1−1; 3201, −1−1−1−1; 1023, +1+1−1+1;
   1023, −1+1−1+1; 1023, +1−1−1+1; 1023, −1−1−1+1; 1023, +1+1−1−1; 1023, −1+1−1 −1; 1023, +1−1−1−1; 1023, −1−1−1−1; and
parts for emitting the signal sequence K1(j) with the aim of synchronization with a receiving unit.

13. A mobile station comprising a part for determining a signal sequence K(i) formed using the following formation rule using modulated repetition of a partial signal sequence "a" consisting of 16 elements:
   K=<a, a, a, −a, −a, a, −a, −a, a, a, a, −a, a, −a, a, a>,
   and wherein the signal sequence is formed in accordance with the following relationship wherein a second partial signal sequence K2(k) of length n2=16 is repeated n1=16 times and is modulated in the process with a first partial signal sequence K1(j) of length n1=16, the modulation of the second partial signal sequence K2(k) can be obtained using the following rule:
   K(i)=K2(i mod n2)*K1(i div n2), for i=0 ... n1*n2−1,
   at least one of the partial signal sequences being a Golay sequence $X_n(k)$ of length nx=n1=16, which can be formed using the following relationship:
   $X_0(k) = \delta(k)$
   $X'_0(k) = \delta(k)$
   $X_n(k) = X_{n-1}(k) + W_n * X'_{n-1}(k - D_n)$
   $X'_n(k) = X_{n-1}(k) - W_n * X'_{n-1}(k - D_n)$,
   k=0, 1, 2, ..., $2^{NX-1}$
   n=1, 2, ..., NX
   $D_n = 2^{P_n}$
where
   $nx = 16 = 2^{NX}$
   NX=4
$\delta(k)$: Kronecker delta function,
the permutation $P_1$, $P_2$, $P_3$, $P_4$ and unit variable $W_1$, $W_2$, $W_3$, $W_4$ can be used to form a partial signal sequence being taken from the following set of permutation/unit variable pairs ($P_1$, $P_2$, $P_3$, $P_4$, $W_1$, $W_2$, $W_3$, $W_4$;):
   3201, +1−1+1+1; 3201, −1−1+1+1; 3201, +1−1−1+1; 3201, −1−1−1+1; 3201, +1 −1+1−1; 3201, −1−1+1−1; 3201, +−1−1−1−1; 3201, −1−1−1−1; 1023, +1+1−1+1;
   1023, −1+1−1+1; 1023, +1−1−1+1; 1023, −1−1−1+1; 1023, +1+1−1−1; 1023, −1+1−1 −1; 1023, +1−1−1−1; 1023, −1−1−1−1;
and knowledge of the first and second partial signal sequences K1(j) K2(k) being used; and
a processor for processing the signal sequence K(i) for synchronization with a base station.

* * * * *